(12) United States Patent
Hsieh et al.

(10) Patent No.: US 8,427,760 B2
(45) Date of Patent: Apr. 23, 2013

(54) IMAGE CAPTURING OPTICAL SYSTEM

(75) Inventors: Dung-Yi Hsieh, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 52 days.

(21) Appl. No.: 13/174,790

(22) Filed: Jul. 1, 2011

(65) Prior Publication Data
US 2012/0170140 A1 Jul. 5, 2012

(30) Foreign Application Priority Data
Dec. 29, 2010 (TW) ................................ 99146645 A

(51) Int. Cl.
*G02B 3/02* (2006.01)
*G02B 9/14* (2006.01)
(52) U.S. Cl.
USPC .......................................... 359/716; 359/792

(58) Field of Classification Search .................. 359/708, 359/713–716, 754–757, 759, 763, 764, 767, 359/771, 772, 780, 784, 792
See application file for complete search history.

(56) References Cited

U.S. PATENT DOCUMENTS 3,778,133 A * 12/1973 Tatian ........................... 359/356
6,950,246 B2 * 9/2005 Amanai ....................... 359/771

* cited by examiner

*Primary Examiner* — Darryl J Collins
(74) *Attorney, Agent, or Firm* — CKC & Partners Co., Ltd.

(57) ABSTRACT

An image capturing optical system includes, in order from an object side to an image side: the first lens element with positive refractive power having a convex object-side surface, the second lens element with positive refractive power having a concave object-side surface and a convex image-side surface, the third lens element with positive refractive power having a concave object-side surface and a convex image-side surface, wherein the object-side surface and the image-side surface of the third lens element are aspheric. By such arrangement, the total track length and the photosensitivity of the image capturing optical system can be effectively reduced while retaining high image quality. The image capturing optical system can also be applied to an infrared optical system.

19 Claims, 12 Drawing Sheets

IMAGE CAPTURING OPTICAL SYSTEM

RELATED APPLICATIONS

The application claims priority to Taiwan Application Serial Number 099146645, filed Dec. 29, 2010, which is herein incorporated by reference.

BACKGROUND

1. Technical Field

The present invention relates to an image capturing optical system. More particularly, the present invention relates to a compact image capturing optical system which can be applied to an infrared optical system.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly for reducing the production cost mainly adopts a two-piece lens structure, as disclosed in U.S. Pat. No. 7,525,741. However, the ability for correcting the aberration by the two-piece lens structure cannot satisfy the requirements of the higher-level camera modules. But, the total track length cannot be reduced by arrange too many lens element.

For retaining high image quality and reducing total track length, another photographing lens assembly provides a three-lens structure, as disclosed in U.S. Pat. No. 7,443,613, wherein the three lens elements have a concave object-side surface and a concave image-side surface respectively, so that the refractive power of the lens elements be weakened by the shape of the lens elements while reducing the total track length of the photographing lens assembly difficulty.

Besides, the conventional photographing lens assembly and the conventional infrared optical lens assembly are made of different material. In general, the infrared optical lens assembly is made of germanium of others material, such as ZnSe, ZnS etc. Therefore, the conventional photographing lens assembly cannot be applied to an infrared optical system.

SUMMARY

The present invention provides an image capturing optical system including, in order from an object side to an image side: a first lens element, a second lens element and a third lens element. The first lens element with positive refractive power has a convex object-side surface. The second lens element with positive refractive power has a concave object-side surface and a convex image-side surface. The third lens element with positive refractive power has a concave object-side surface and a convex image-side surface, wherein the object-side surface and the image-side surface of the third lens element are aspheric, and the third lens element is made of plastic material.

DETAILED DESCRIPTION

Figure 1:
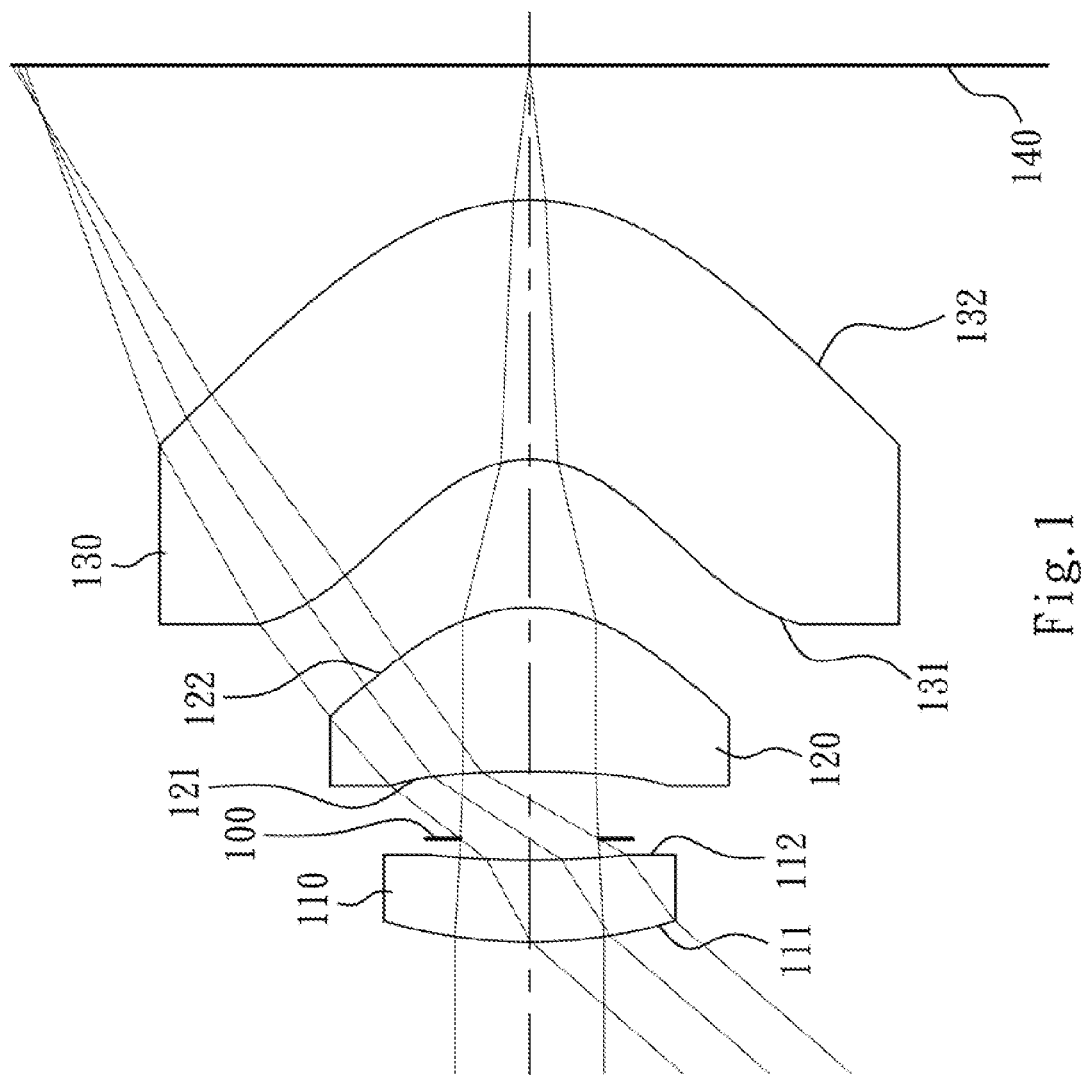
FIG. 1 is a schematic view of an image capturing optical system according to the first embodiment.

An image capturing optical system includes, in order from an object side to an image side; a first lens element, a second lens element and a third lens element. The image capturing optical system further includes an image sensor located on the image plane.

The first lens element with positive refractive power provides partial refractive power for reducing the total track length of the image capturing optical system. The first lens element has a convex object-side surface and a convex image-side surface or a concave image-side surface. When the first lens element has a convex image-side surface, the refractive power thereof can be effectively enhanced, thus allowing further reduction of the total track length of the image capturing optical system. When the first lens element has a concave image-side surface, the astigmatism of the image capturing optical system can be corrected while retaining high image quality.

The second lens element with positive refractive power provides main refractive power for reducing the total track length of the image capturing optical system, and the refractive power of the third lens element can reduce the photosensitivity of the image capturing optical system by providing a partial distribution of the first lens element's refractive power. The second lens element has a concave object-side surface and a convex image-side surface, so that the second lens element can correct the aberration of the first lens element and correct the astigmatism of the image capturing optical system. Furthermore, the object-side surface and the image-side surface of the second lens element are aspheric.

The third lens element with positive refractive power provides partial refractive power for reducing the total track length of the image capturing optical system. The third lens element has a concave object-side surface and a convex image-side surface, so that the third lens element can correct the astigmatism and the high order aberration of the image capturing optical system. Furthermore, the object-side surface and the image-side surface of the third lens element are aspheric, and the third lens element has at least one inflection point formed on at least one of the object-side surface and the image-side surface thereof. Therefore, the incident angle of the off-axis field of light on the image sensor can be efficiently restrained and the aberration of the off-axis field can be corrected.

The image capturing optical system further includes a stop, which can be an aperture stop. An axial distance between the stop and the image plane is SL, an axial distance between the object-side surface of the first lens element and the image plane is TTL, and they satisfy the following relationship:

$$0.68<SL/TTL<0.93.$$

Therefore, the wide-angle characteristic of the image capturing optical system can be enhanced, and the distortion and the chromatic aberration can be corrected for reducing the photosensitivity of the image capturing optical system.

A focal length of the image capturing optical system is f, a focal length of the second lens element is f2, and they satisfy the following relationship:

$$1.2<f/f2<2.4.$$

When the above relation is satisfied, the refractive power of the second lens element can be controlled for reducing the total track length of the image capturing optical system.

A curvature radius of the object-side surface of the second lens element is R3, a curvature radius of the image-side surface of the second lens element is R4, and they satisfy the following relationship:

$$1<(R3+R4)/(R3-R4)<5.$$

When the above relation is satisfied, the second lens element is meniscus lens has a concave object-side surface and a convex image-side surface for correcting the astigmatism of the image capturing optical system.

R3 and R4 can further satisfy the following relationship:

$$1.0<(R3+R4)/(R3-R4)<2.5.$$

An axial distance between the first lens element and the second lens element is T12, an axial distance between the second lens element and the third lens element is T23, and they satisfy the following relationship:

$$0.1 \leq T12/T23 \leq 1.0.$$

By the above arrangement of the second lens element can reduce the total track length of the image capturing optical system.

A focal length of the first lens element is f1, the focal length of the second lens element is f2, and they satisfy the following relationship:

$$0.1<f2/f1<0.6.$$

Therefore, the refractive power of the second lens element can reduce the aberration and the photosensitivity of the image capturing optical system.

f2 and f1 can further satisfy the following relationship:

$$0.2<f2/f1<0.4.$$

A central thickness of the first lens element is CT1, the axial distance between the first lens element and the second lens element is T12, and they satisfy the following relationship:

$$0.4<CT1/T12<1.3.$$

Therefore, the thickness of first lens element and the distance between the first lens element and the second lens element can provide a partial distribution of the image capturing optical system while reducing the photosensitivity of the image capturing optical system.

A curvature radius of the object-side surface of the third lens element is R5, the focal length of the image capturing optical system is f, and they satisfy the following relationship:

$$-0.4<R5/f<-0.1.$$

When the above relation is satisfied, the astigmatism and the high order aberration of the image capturing optical system can be corrected.

The focal length of the image capturing optical system is f, a focal length of the third lens element is f3, and they satisfy the following relationship:

$$0.0<f/f3<0.3.$$

Therefore, the refractive power of the third lens element can provide a partial distribution of the image capturing optical system while reducing the photosensitivity of the image capturing optical system.

According to the image capturing optical system of the present invention is applied to the wavelength between 750 nm and 1200 nm, so that can be applied to an infrared optical system.

A half of a diagonal length of an effective photosensitive area of the image sensor is ImgH, the axial distance between the object-side surface of the first lens element and the image plane is TTL, and they satisfy the following relationship:

$$TTL/ImgH<1.8.$$

When the above relation is satisfied, the total track length of the image capturing optical system can be reduced for applications on compact and portable electronic products.

According to the image capturing optical system of the present invention, if a lens element has a convex surface, it means that the paraxial region of the surface is convex, and if a lens element has a concave surface, it means that the paraxial region of the surface is concave.

According to the image capturing optical system of the present invention, a lens element can be made of glass material or plastic material. When the lens element is made of glass material, the distribution of degree of freedom of the refractive power of the image capturing optical system can be increased. When the lens element is made of plastic material, the cost of manufacturing can be effectively reduced.

Additionally, the surfaces of the lens element can be aspheric, so as to easily form the surfaces into non-spherical profiles, thereby obtaining more controllable variables for reducing aberration and amount of the required lens elements. Therefore, the total track length of the image capturing optical system can be reduced.

According to the image capturing optical system of the present invention, the image capturing optical system can include at least one stop for reducing stray light while retaining high image quality.

According to the above description of the present invention, the following 1st-6th specific embodiments are provided for further explanation.

Figure 2:
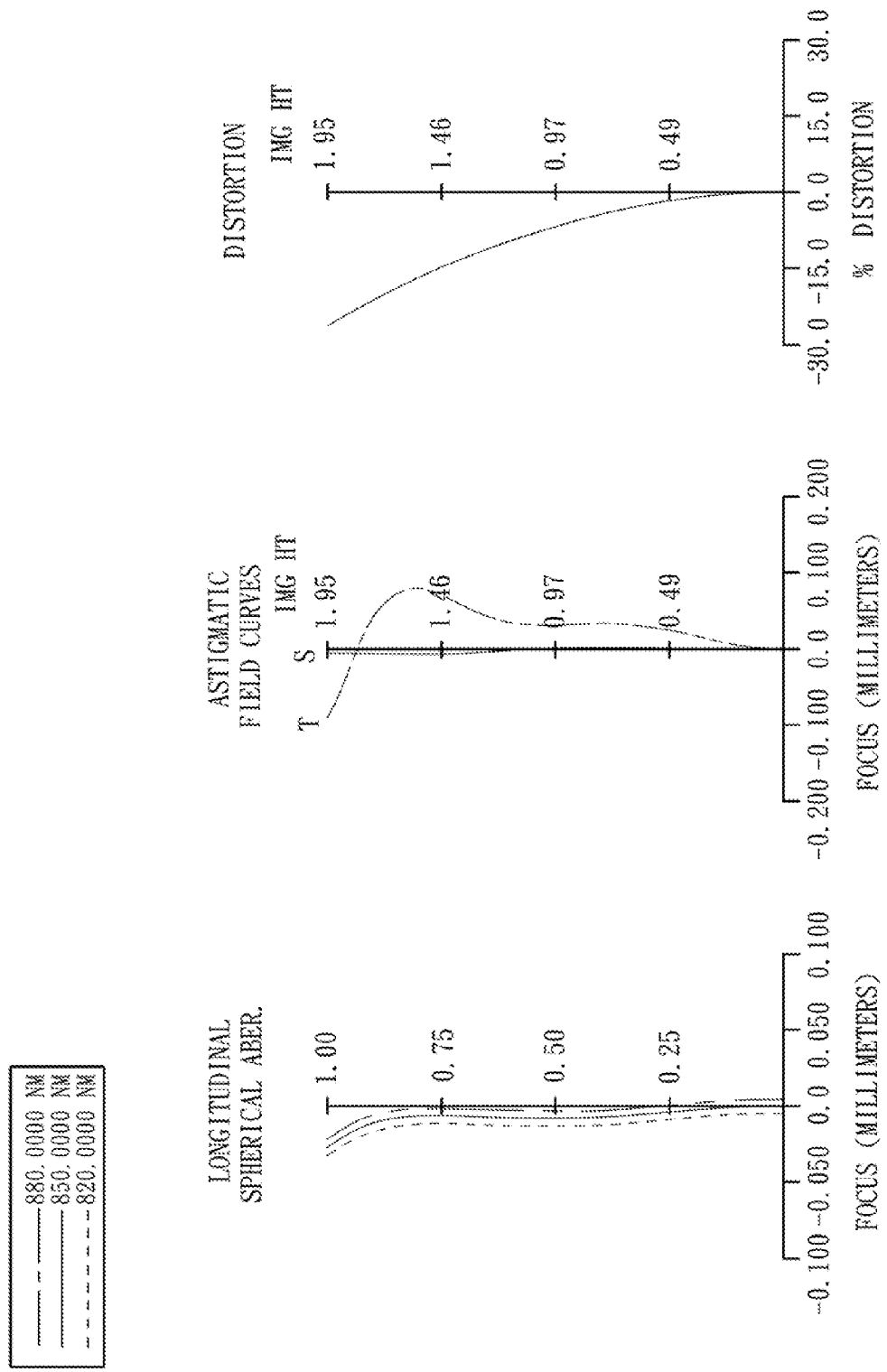
FIG. 2 shows spherical aberration curves, astigmatic field curves and distortion curve of the image capturing optical system according to the first embodiment.

FIG. 1 is a schematic view of an image capturing optical system according to the first embodiment. FIG. 2 shows spherical aberration curves, astigmatic field curves and distortion curve of the image capturing optical system according to the first embodiment. In FIG. 1, the image capturing optical system includes, in order from an object side to an image side: the first lens element 110, an aperture stop 100, the second lens element 120, the third lens element 130 and the image plane 140. The image capturing optical system further includes an image sensor that is located on the image plane 140.

The first lens element 110 is made of plastic material (ex. OKP4HT—polyester material). The first lens element 110 with positive refractive power has a convex object-side surface 111 and a concave image-side surface 112. The object-side surface 111 and the image-side surface 112 of the first lens element 110 are aspheric.

The second lens element 120 is made of plastic material (ex. PC—Polycarbonate material). The second lens element 120 with positive refractive power has a concave object-side surface 121 and a convex image-side surface 122. The object-side surface 121 and the image-side surface 122 of the second lens element 120 are aspheric.

The third lens element 130 is made of plastic material (ex. OKP4HT—polyester material). The third lens element 130 with positive refractive power has a concave object-side surface 131 and a convex image-side surface 132. The object-side surface 131 and the image-side surface 132 of the third lens element 130 are aspheric. Furthermore, the third lens element 130 has inflection points formed on the object-side surface 131 and the image-side surface 132 thereof.

The equation of the aspheric surface profiles of the aforementioned lens elements of the first embodiment is expressed as follows:

$$X(Y) = (Y^2/R)/(1 + \text{sqrt}(1 - (1+k) \times (Y/R)^2)) + \sum_i (Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the image capturing optical system according to the first embodiment, the focal length and the refractive index are calculated based on a wavelength of 850.0 nm.

In the image capturing optical system according to the first embodiment, f is a focal length of the image capturing optical system, Fno is an f-number of the image capturing optical system, HFOV is half of the maximal field of view, and they satisfy the following relationships:

$f=2.29$ mm;

$F\text{no}=4.05$; and

HFOV=49.2 degrees.

In the image capturing optical system according to the first embodiment, f is the focal length of the image capturing optical system, f1 is a focal length of the first lens element 110, f2 is an focal length of the second lens element 120, f3 is a focal length of the third lens element 130, and they satisfy the following relationships:

$f/f2=1.82$;

$f/f3=0.04$; and $f2/f1=0.23$.

In the image capturing optical system according to the first embodiment, f is the focal length of the image capturing optical system, R5 is a curvature radius of the object-side surface 131 of the third lens element 130, and they satisfy the following relationship:

$R5/f=-0.19$.

In the image capturing optical system according to the first embodiment, R3 is a curvature radius of the object-side surface 121 of the second lens element 120, R4 is a curvature radius of the image-side surface 122 of the second lens element 120, and they satisfy the following relationship:

$(R3+R4)/(R3-R4)=1.34$.

In the image capturing optical system according to the first embodiment, CT1 is a central thickness of the first lens element 110, T12 is an axial distance between the first lens element 110 and the second lens element 120, and they satisfy the following relationship:

$CT1/T12=0.91$.

In the image capturing optical system according to the first embodiment, T12 is the axial distance between the first lens element 110 and the second lens element 120, T23 is an axial distance between the second lens element 120 and the third lens element 130, and they satisfy the following relationship:

$T12/T23=0.60$.

In the image capturing optical system according to the first embodiment, SL is an axial distance between the aperture stop 100 and an image plane 140, TTL is an axial distance between the object-side surface 111 of the first lens element 110 and the image plane 140, and they satisfy the following relationship:

$SL/TTL=0.88$.

In the image capturing optical system according to the first embodiment, ImgH is a half of a diagonal length of an effective photosensitive area of the image sensor, TTL is the axial distance between the object-side surface 111 of the first lens element 110 and the image plane 140, and they satisfy the following relationship:

$TTL/ImgH=1.72$.

The detailed optical data of the first embodiment is shown in Table 1, and the aspheric surface data is shown in Table 2 as follows.

TABLE 1

1st Embodiment
f = 2.29 mm, Fno = 4.05, HFOV = 49.2 deg.

| Surface # | | Curvature Radius | Thickness | Material | Index | Focal length |
|---|---|---|---|---|---|---|
| 0 | Object | Plano | Infinity | | | |
| 1 | Lens 1 | 1.803983 (ASP) | 0.312 | Plastic | OKP4HT | 1.614 | 5.57 |
| 2 | | 3.571429 (ASP) | 0.081 | | | |
| 3 | Ape. Stop | Plano | 0.260 | | | |
| 4 | Lens 2 | −4.447494 (ASP) | 0.623 | Plastic | PC | 1.569 | 1.26 |
| 5 | | −0.649653 (ASP) | 0.565 | | | |
| 6 | Lens 3 | −0.436019 (ASP) | 0.990 | Plastic | OKP4HT | 1.614 | 63.45 |
| 7 | | −0.803498 (ASP) | 0.500 | | | |
| 8 | | Plano | 0.014 | | | |
| 9 | Image | Plano | — | | | |

The focal length and the refractive index are calculated based on a wavelength of 850.0 nm.

TABLE 2

Aspheric Coefficients

| | Surface # | | |
|---|---|---|---|
| | 1 | 2 | 4 |
| k = | −4.37395E+00 | −1.96409E+02 | −1.33009E+02 |
| A4 = | −1.53120E−01 | 2.35392E−01 | −5.48162E−01 |
| A6 = | 8.69128E−01 | 1.47261E+00 | 1.11791E+00 |
| A8 = | −1.48427E+00 | −6.00307E+00 | 1.28033E+00 |
| A10 = | 1.13648E+00 | −1.27634E+01 | −1.33381E+01 |
| A12 = | — | — | 7.87821E−08 |

| | Surface # | | |
|---|---|---|---|
| | 5 | 6 | 7 |
| k = | −3.04372E+00 | −1.00000E+00 | −7.34155E−01 |
| A4 = | −9.56442E−01 | 3.16181E−01 | 1.62061E−01 |
| A6 = | 1.63664E+00 | 4.93305E−01 | −3.95762E−02 |
| A8 = | −3.51020E+00 | −1.60608E−01 | 8.74196E−02 |
| A10 = | 9.71336E+00 | −2.24154E−01 | −5.75396E−02 |
| A12 = | −9.35999E+00 | 1.05243E−01 | 1.44298E−02 |

In Table 1, the curvature radius, the thickness and the focal length are shown in millimeters (mm). Surface numbers 0-9 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 12th. All labels for Tables of the remaining embodiments share the same definitions as those in Table 1 and Table 2 of the first embodiment, and their definitions will not be stated again.

Figure 3:
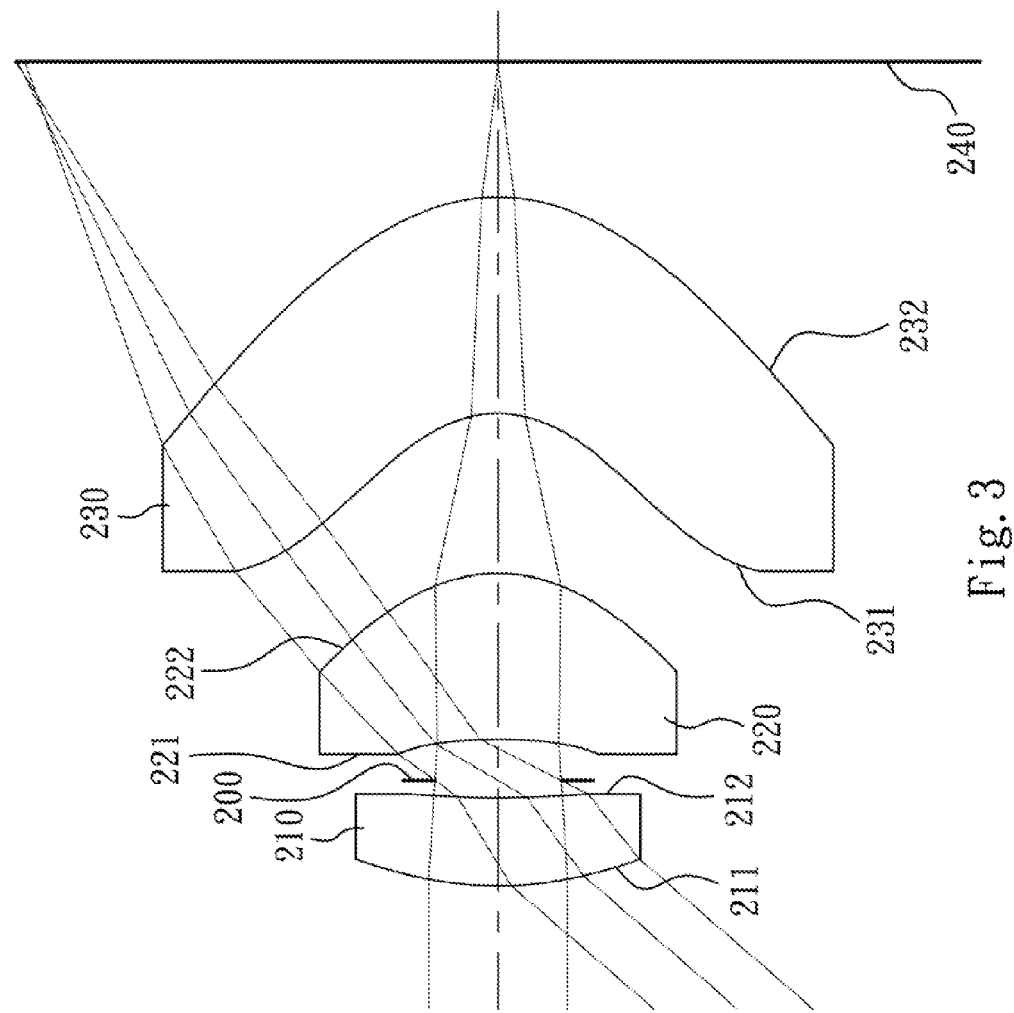
FIG. 3 is a schematic view of an image capturing optical system according to the second embodiment.
Figure 4:
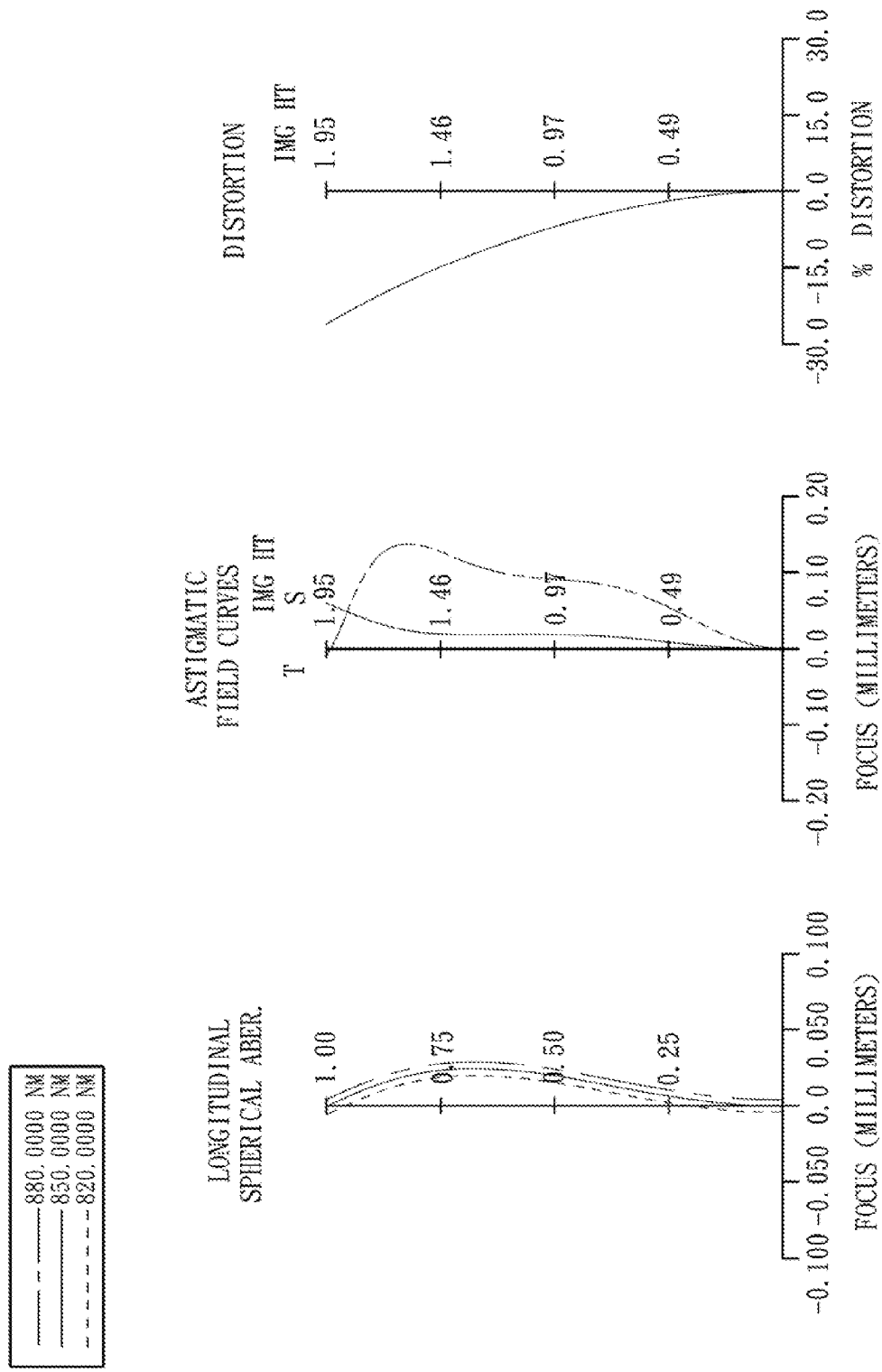
FIG. 4 shows spherical aberration curves, astigmatic field curves and distortion curve of the image capturing optical system according to the second embodiment.

FIG. 3 is a schematic view of an image capturing optical system according to the second embodiment. FIG. 4 shows spherical aberration curves, astigmatic field curves and distortion curve of the image capturing optical system according to the second embodiment. In FIG. 3, the image capturing optical system includes, in order from an object side to an image side: the first lens element 210, an aperture stop 200, the second lens element 220, the third lens element 230 and an image plane 940. The image capturing optical system further includes an image sensor that is located on the image plane 240.

The first lens element 210 is made of plastic material (ex. ARTON-D4532—alicyclic polyolefin resin material). The first lens element 210 with positive refractive power has a convex object-side surface 211 and a concave image-side surface 212. The object-side surface 211 and the image-side surface 212 of the first lens element 210 are aspheric.

The second lens element 220 is made of plastic material (ex. PC—Polycarbonate material). The second lens element 220 with positive refractive power has a concave object-side surface 221 and a convex image-side surface 222. The object-side surface 221 and the image-side surface 222 of the second lens element 220 are aspheric.

The third lens element 230 is made of plastic material (ex. APEL-5514ML—cycloolefin copolymer material). The third lens element 230 with positive refractive power has a concave object-side surface 231 and a convex image-side surface 232. The object-side surface 231 and the image-side surface 232 of the third lens element 230 are aspheric. Furthermore, the third lens element 230 has inflection points formed on the object-side surface 231 and the image-side surface 232 thereof.

The equation of the aspheric surface profiles of the aforementioned lens elements of the second embodiment is the same as that of the first embodiment, and will not be stated herein again.

In the image capturing optical system according to the second embodiment, the focal length and the refractive index are calculated based on a wavelength of 850.0 nm.

In the image capturing optical system according to the second embodiment, the definitions of f, Fno, HFOV, f1, f2, f3, R3, R4, R5, CT1, T12, T23, SL, TTL and ImgH are the same as those stated in the first embodiment with corresponding values for the second embodiment, and they satisfy the following relationships:

| f(mm) | 2.28 | R5/f | −0.20 |
|---|---|---|---|
| Fno | 4.05 | (R3 + R4)/(R3 − R4) | 1.98 |
| HFOV(degrees) | 49.1 | CT1/T12 | 1.51 |
| f/f2 | 1.55 | T12/T23 | 0.37 |
| f/f3 | 0.03 | SL/TTL | 0.87 |
| f2/f1 | 0.34 | TTL/ImgH | 1.72 |

The detailed optical data of the second embodiment is shown in Table 3, and the aspheric surface data is shown in Table 4 as follows.

TABLE 3

2nd Embodiment
f = 2.28 mm, Fno = 4.05, HFOV = 49.1 deg.

| Surface # | | Curvature Radius | Thickness | Material | Index | Focal length |
|---|---|---|---|---|---|---|
| 0 | Object | Plano | Infinity | | | |
| 1 | Lens 1 | 1.399000 (ASP) | 0.358 | Plastic | ARTON-D4532 1.507 | 4.30 |
| 2 | | 3.571400 (ASP) | 0.070 | | | |
| 3 | Ape. Stop | Plano | 0.167 | | | |
| 4 | Lens 2 | −2.026110 (ASP) | 0.674 | Plastic | PC 1.569 | 1.47 |
| 5 | | −0.664490 (ASP) | 0.649 | | | |
| 6 | Lens 3 | −0.456810 (ASP) | 0.878 | Plastic | APEL-5514ML 1.537 | 74.59 |
| 7 | | −0.754810 (ASP) | 0.500 | | | |
| 8 | | Plano | 0.052 | | | |
| 9 | Image | Plano | — | | | |

The focal length and the refractive index are calculated based on a wavelength of 850.0 nm.

TABLE 4

Aspheric Coefficients

| | Surface # | | |
|---|---|---|---|
| | 1 | 2 | 4 |
| k = | −4.62138E+00 | −1.01692E+02 | −5.04740E+00 |
| A4 = | −6.19425E−02 | −5.05842E−02 | −7.00661E−01 |

TABLE 4-continued

Aspheric Coefficients

| | | | |
|---|---|---|---|
| A6 = | 6.59860E−01 | −4.24189E−03 | 1.37667E+00 |
| A8 = | −1.58829E+00 | 7.92572E+00 | 7.19148E+00 |
| A10 = | 1.26647E+00 | −4.44497E+01 | −1.14576E+02 |
| A12 = | — | — | 6.85985E−08 |

| | Surface # | | |
|---|---|---|---|
| | 5 | 6 | 7 |
| k = | −3.28158E+00 | −1.00000E+00 | −8.67522E−01 |
| A4 = | −9.97016E−01 | 2.11537E−01 | 1.16097E−01 |
| A6 = | 1.59684E+00 | 5.60465E−01 | −4.17228E−02 |
| A8 = | −3.44888E+00 | −2.11416E−01 | 8.88925E−02 |
| A10 = | 9.37535E+00 | −1.94453E−01 | −6.55458E−02 |
| A12 = | −9.59871E+00 | 1.05631E−01 | 1.58382E−02 |

Figure 5:
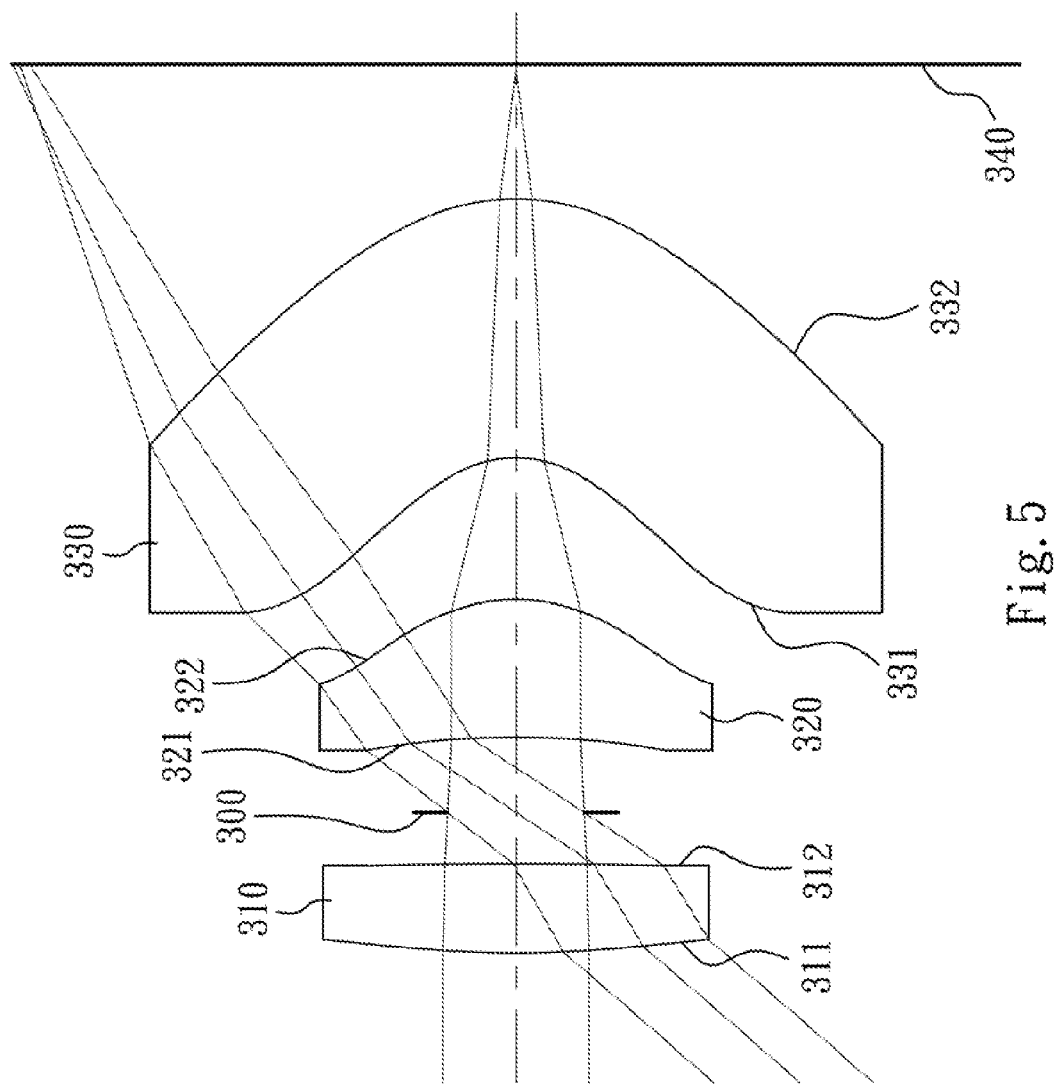
FIG. 5 is a schematic view of an image capturing optical system according to the third embodiment.
Figure 6:
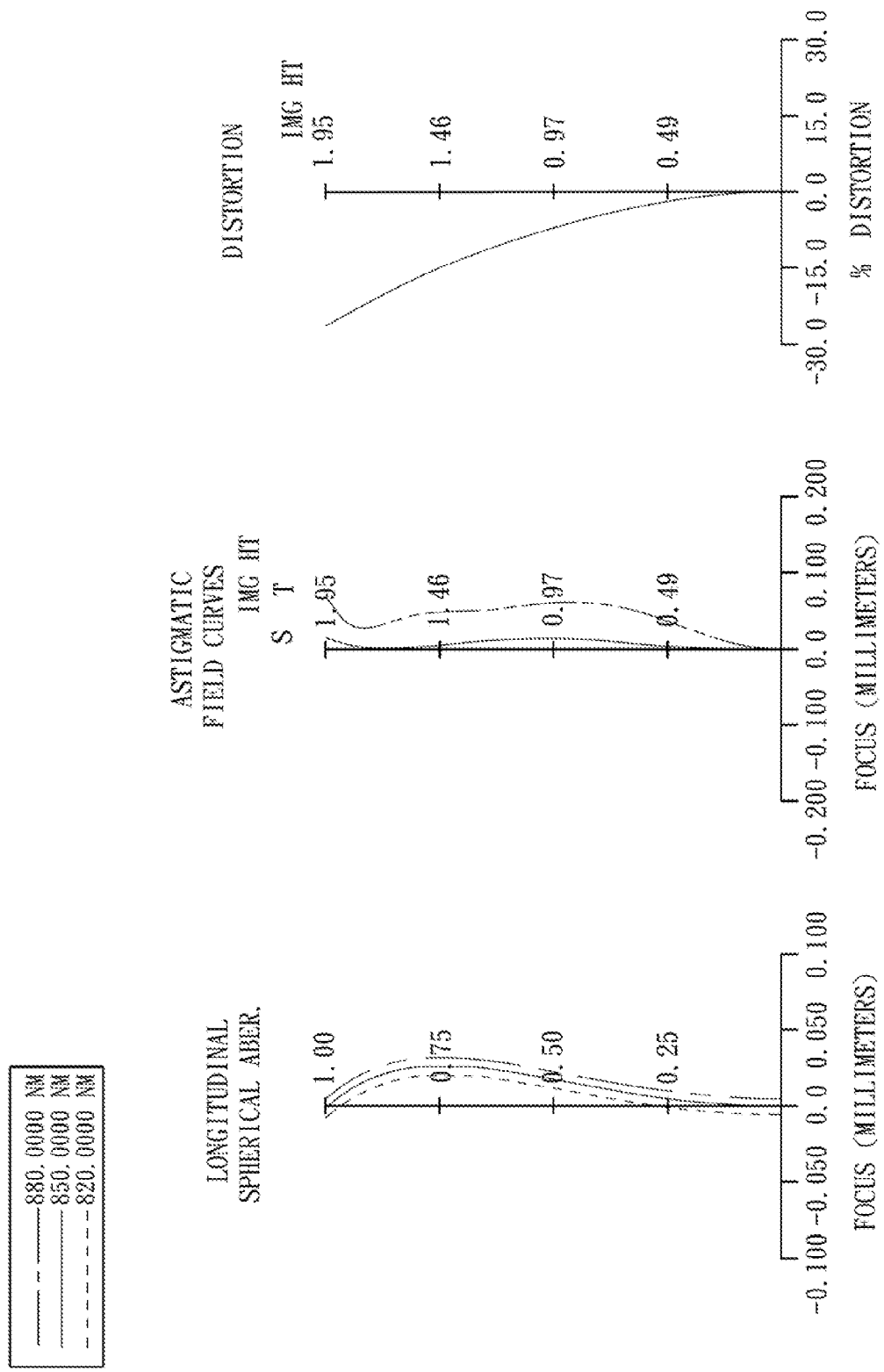
FIG. 6 shows spherical aberration curves, astigmatic field curves and distortion curve of the image capturing optical system according to the third embodiment.

FIG. 5 is a schematic view of an image capturing optical system according to the third embodiment. FIG. 6 shows spherical aberration curves, astigmatic field curves and distortion curve of the image capturing optical system according to the third embodiment. In FIG. 5, the image capturing optical system includes, in order from an object side to an image side: the first lens element 310, an aperture stop 300, the second lens element 320, the third lens element 330 and an image plane 340. The image capturing optical system further includes an image sensor that is located on the image plane 340.

The first lens element 310 is made of plastic material (ex. OKP4HT—polyester material). The first lens element 310 with positive refractive power has a convex object-side surface 311 and a convex image-side surface 312. The object-side surface 311 and the image-side surface 312 of the first lens element 310 are aspheric.

The second lens element 320 is made of plastic material (ex. OKP4HT—polyester material). The second lens element 320 with positive refractive power has a concave object-side surface 321 and a convex image-side surface 322. The object-side surface 321 and the image-side surface 322 of the second lens element 320 are aspheric.

The third lens element 330 is made of plastic material (ex. OKP4HT—polyester material). The third lens element 330 with positive refractive power has a concave object-side surface 331 and a convex image-side surface 332. The object-side surface 331 and the image-side surface 332 of the third lens element 330 are aspheric. Furthermore, the third lens element 330 has inflection points formed on the object-side surface 331 and the image-side surface 332 thereof.

The equation of the aspheric surface profiles of the aforementioned lens elements of the third embodiment is the same as that of the first embodiment, and will not be stated herein again.

In the image capturing optical system according to the third embodiment, the focal length and the refractive index are calculated based on a wavelength of 850.0 nm.

In the image capturing optical system according to the third embodiment, the definitions of f, Fno, HFOV, f1, f2, f3, R3, R4, R5, CT1, T12, T23, SL, TTL and ImgH are the same as those stated in the first embodiment with corresponding values for the third embodiment, and they satisfy the following relationships:

| | | | |
|---|---|---|---|
| f(mm) | 2.29 | R5/f | −0.19 |
| Fno | 4.05 | (R3 + R4)/(R3 − R4) | 1.39 |
| HFOV(degrees) | 49.1 | CT1/T12 | 0.71 |
| f/f2 | 1.78 | T12/T23 | 0.89 |
| f/f3 | 0.05 | SL/TTL | 0.84 |
| f2/f1 | 0.26 | TTL/ImgH | 1.77 |

The detailed optical data of the third embodiment is shown in Table 5, and the aspheric surface data is shown in Table 6 as follows.

TABLE 5

(Embodiment 3)
f = 2.29 mm, Fno = 4.05, HFOV = 49.1 deg.

| Surface # | | Curvature Radius | Thickness | Material | Index | Focal length |
|---|---|---|---|---|---|---|
| 0 | Object | Plano | Infinity | | | |
| 1 | Lens 1 | 3.509378 (ASP) | 0.348 | Plastic | OKP4HT | 1.614 | 4.91 |
| 2 | | −20.392765 (ASP) | 0.196 | | | |
| 3 | Ape. Stop | Plano | 0.293 | | | |
| 4 | Lens 2 | −4.300169 (ASP) | 0.533 | Plastic | OKP4HT | 1.614 | 1.28 |
| 5 | | −0.696700 (ASP) | 0.548 | | | |
| 6 | Lens 3 | −0.435467 (ASP) | 1.006 | Plastic | OKP4HT | 1.614 | 46.22 |
| 7 | | −0.805455 (ASP) | 0.500 | | | |
| 8 | | Plano | 0.021 | | | |
| 9 | Image | Plano | — | | | |

The focal length and the refractive index are calculated based on a wavelength of 850.0 nm.

TABLE 6

Aspheric Coefficients

| | Surface # | | |
|---|---|---|---|
| | 1 | 2 | 4 |
| k = | −1.29610E+01 | 8.90448E+02 | −6.34407E+01 |
| A4 = | −2.11954E−01 | −9.21895E−02 | −4.03843E−01 |
| A6 = | 6.97447E−01 | 1.48379E+00 | 8.96072E−01 |
| A8 = | −1.18629E+00 | −6.46771E+00 | 7.32370E−01 |
| A10 = | 7.47283E−01 | 9.23323E+00 | −3.97301E+00 |
| A12 = | — | — | −1.00360E−04 |

| | Surface # | | |
|---|---|---|---|
| | 5 | 6 | 7 |
| k = | −3.47169E+00 | −1.00000E+00 | −7.58735E−01 |
| A4 = | −9.18267E−01 | 3.27486E−01 | 1.59583E−01 |
| A6 = | 1.64729E+00 | 5.03776E−01 | −4.18012E−02 |
| A8 = | −3.43671E+00 | −1.53633E−01 | 8.74546E−02 |

TABLE 6-continued

Aspheric Coefficients

| A10 = | 1.02615E+01 | −2.26282E−01 | −5.91773E−02 |
| A12 = | −9.14400E+00 | 1.05712E−01 | 1.38534E−02 |

Figure 7:
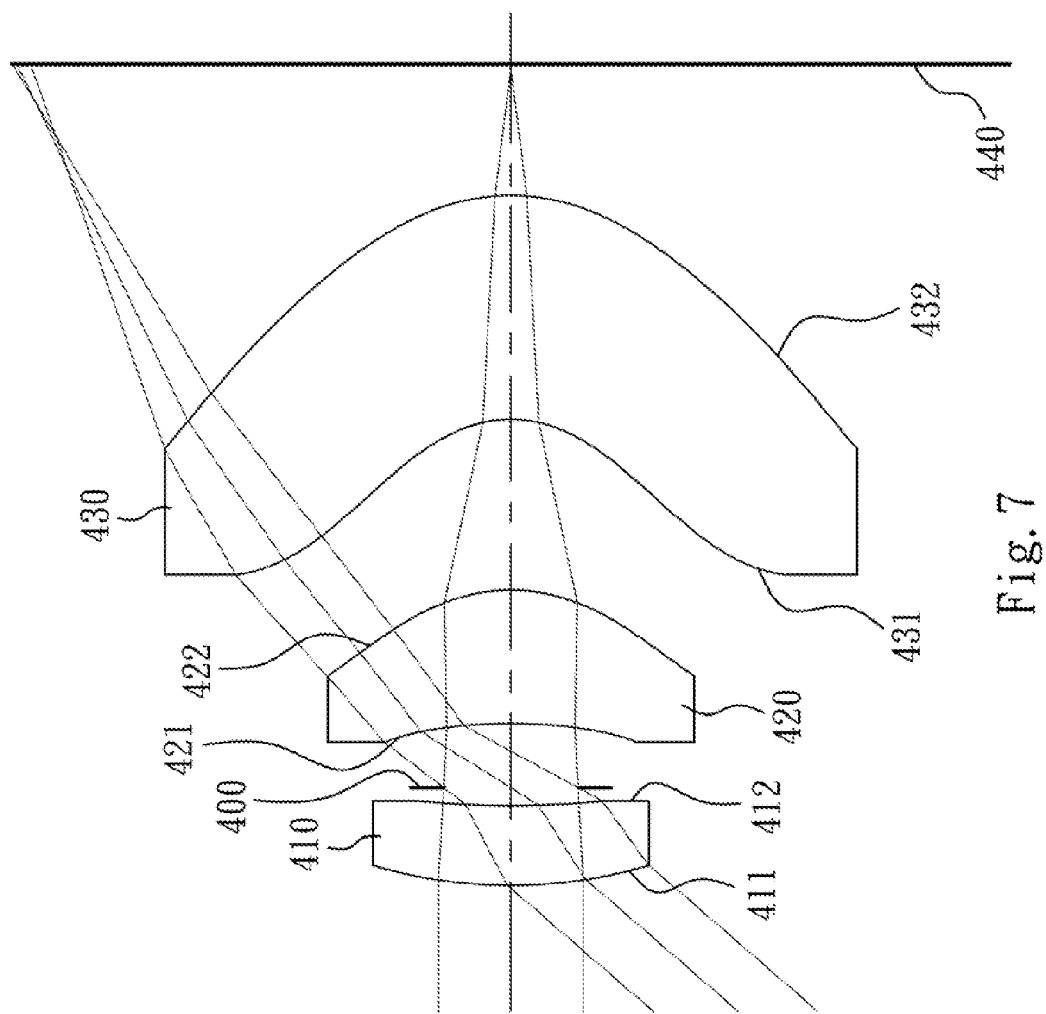
FIG. 7 is a schematic view of an image capturing optical system according to the fourth embodiment.
Figure 8:
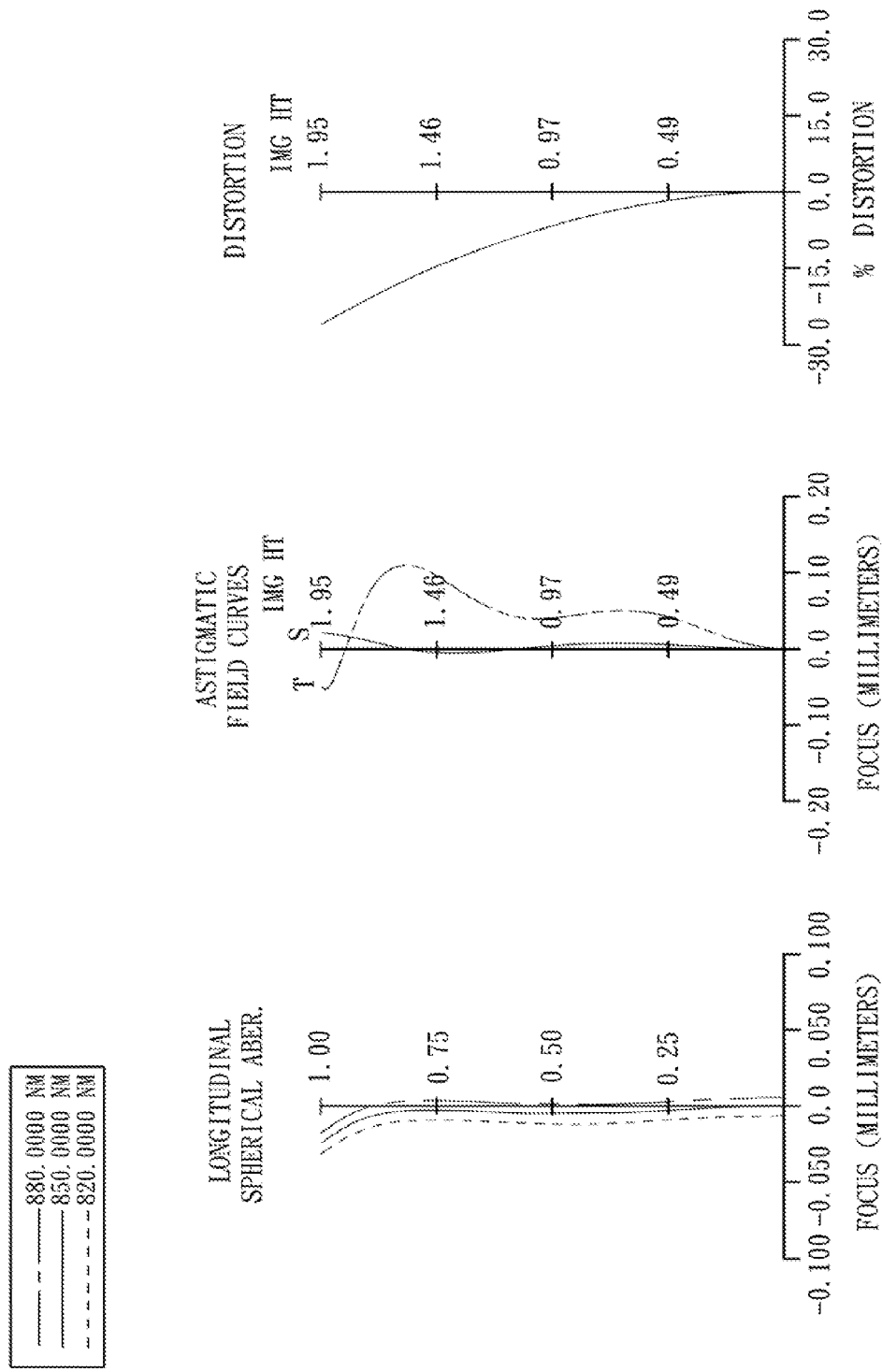
FIG. 8 shows spherical aberration curves, astigmatic field curves and distortion curve of the image capturing optical system according to the fourth embodiment.

FIG. 7 is a schematic view of an image capturing optical system according to the fourth embodiment. FIG. 8 shows spherical aberration curves, astigmatic field curves and distortion curve of the image capturing optical system according to the fourth embodiment. In FIG. 7, the image capturing optical system includes, in order from an object side to an image side: the first lens element 410, an aperture stop 400, the second lens element 420, the third lens element 430 and an image plane 440. The image capturing optical system further includes an image sensor that is located on the image plane 440.

The first lens element 410 is made of plastic material (ex. OKP4HT—polyester material). The first lens element 410 with positive refractive power has a convex object-side surface 411 and a concave image-side surface 412. The object-side surface 411 and the image-side surface 412 of the first lens element 410 are aspheric.

The second lens element 420 is made of plastic material (ex. OKP4HT—polyester material). The second lens element 420 with positive refractive power has a concave object-side surface 421 and a convex image-side surface 422. The object-side surface 421 and the image-side surface 422 of the second lens element 420 are aspheric.

The third lens element 430 is made of plastic material (ex. ZEONEX F52R—cycloolefin copolymer material). The third lens element 430 with positive refractive power has a concave object-side surface 431 and a convex image-side surface 432. The object-side surface 431 and the image-side surface 432 of the third lens element 430 are aspheric. Furthermore, the third lens element 430 has inflection points formed on the object-side surface 431 and the image-side surface 432 thereof.

The equation of the aspheric surface profiles of the aforementioned lens elements of the fourth embodiment is the same as that of the first embodiment, and will not be stated herein again.

In the image capturing optical system according to the fourth embodiment, the focal length and the refractive index are calculated based on a wavelength of 850.0 nm.

In the image capturing optical system according to the fourth embodiment, the definitions of f, Fno, HFOV, f1, f2, f3, R3, R4, R5, CT1, T12, T23, SL, TTL and ImgH are the same as those stated in the first embodiment with corresponding values for the fourth embodiment, and they satisfy the following relationships:

| f(mm) | 2.29 | R5/f | −0.20 |
| Fno | 4.00 | (R3 + R4)/(R3 − R4) | 2.00 |
| HFOV(degrees) | 49.1 | CT1/T12 | 0.97 |
| f/f2 | 1.52 | T12/T23 | 0.48 |
| f/f3 | 0.03 | SL/TTL | 0.88 |
| f2/f1 | 0.31 | TTL/ImgH | 1.67 |

The detailed optical data of the fourth embodiment is shown in Table 7, and the aspheric surface data is shown in Table 8 as follows.

TABLE 7

(Embodiment 4)
f = 2.29 mm, Fno = 4.00, HFOV = 49.1 deg.

| Surface # | | Curvature Radius | Thickness | Material | Index | Focal length |
|---|---|---|---|---|---|---|
| 0 | Object | Plano | Infinity | | | |
| 1 | Lens 1 | 1.681113 (ASP) | 0.315 | Plastic | OKP4HT | 1.614 | 4.87 |
| 2 | | 3.571429 (ASP) | 0.070 | | | | |
| 3 | Ape. Stop | Plano | 0.256 | | | | |
| 4 | Lens 2 | −2.106469 (ASP) | 0.526 | Plastic | OKP4HT | 1.614 | 1.50 |
| 5 | | −0.702647 (ASP) | 0.674 | | | | |
| 6 | Lens 3 | −0.468510 (ASP) | 0.887 | Plastic | ZEONEXF52R | 1.527 | 76.24 |
| 7 | | −0.765557 (ASP) | 0.500 | | | | |
| 8 | | Plano | 0.018 | | | | |
| 9 | Image | Plano | — | | | | |

The focal length and the refractive index are calculated based on a wavelength of 850.0 nm.

TABLE 8

Aspheric Coefficients

| | Surface # | | |
|---|---|---|---|
| | 1 | 2 | 4 |
| k = | −1.01231E+01 | −8.91050E+01 | −4.29499E+01 |
| A4 = | −4.53800E−02 | −5.31700E−02 | −6.83284E−01 |
| A6 = | 1.02726E+00 | 3.53163E+00 | 6.31422E−01 |
| A8 = | −2.77700E+00 | −2.00477E+01 | 6.12623E+00 |
| A10 = | 2.72714E+00 | 2.24926E+01 | −2.52763E+01 |
| A12 = | — | — | −1.54127E−04 |

| | Surface # | | |
|---|---|---|---|
| | 5 | 6 | 7 |
| k = | −3.81643E+00 | −1.00000E+00 | −9.07751E−01 |
| A4 = | −9.99599E−01 | 2.17246E−01 | 1.13681E−01 |
| A6 = | 1.67448E+00 | 5.11495E−01 | −5.20527E−02 |
| A8 = | −2.78534E+00 | −1.41644E−01 | 9.41762E−02 |
| A10 = | 8.67828E+00 | −2.21749E−01 | −7.19396E−02 |
| A12 = | −9.36005E+00 | 1.04635E−01 | 1.77493E−02 |

Figure 9:
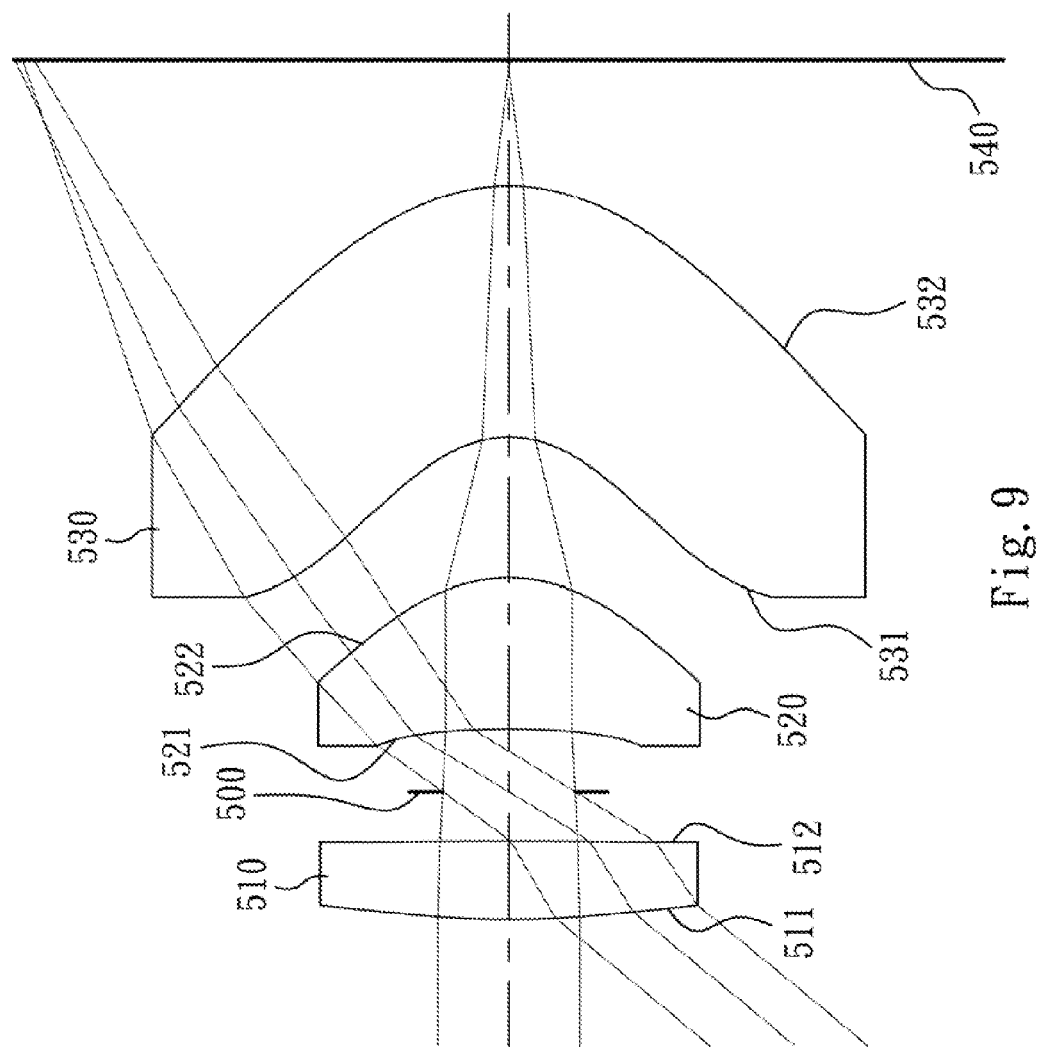
FIG. 9 is a schematic view of an image capturing optical system according to the fifth embodiment.
Figure 10:
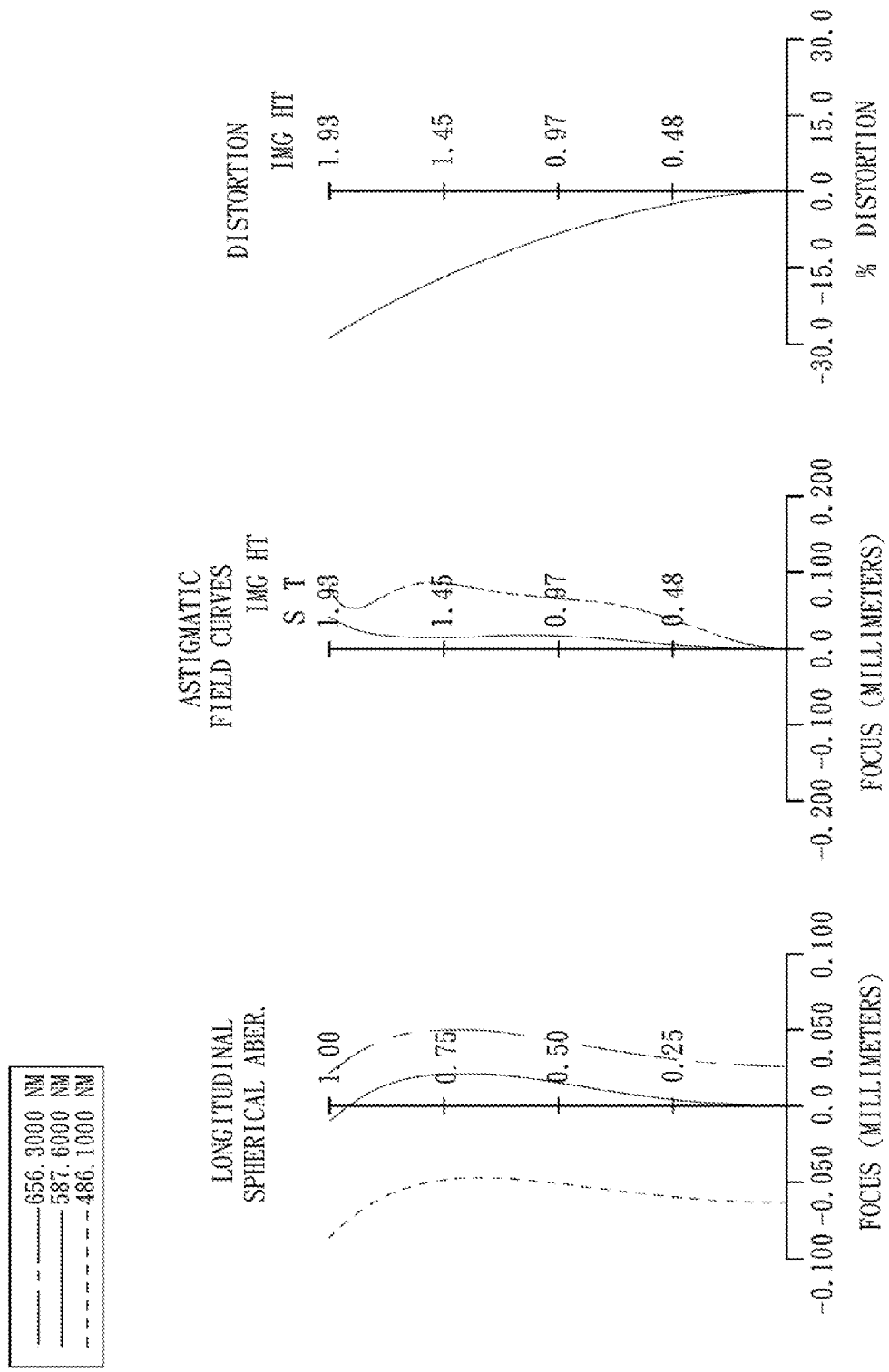
FIG. 10 shows spherical aberration curves, astigmatic field curves and distortion curve of the image capturing optical system according to the fifth embodiment.

FIG. 9 is a schematic view of an image capturing optical system according to the fifth embodiment. FIG. 10 shows spherical aberration curves, astigmatic field curves and distortion curve of the image capturing optical system according to the fifth embodiment. In FIG. 9, the image capturing optical system includes, in order from an object side to an image side: the first lens element 510, an aperture stop 500, the second lens element 520, the third lens element 530 and an image plane 540. The image capturing optical system further includes an image sensor that is located on the image plane 540.

The first lens element 510 is made of plastic material (ex. OKP4HT—polyester material). The first lens element 510 with positive refractive power has a convex object-side surface 511 and a convex image-side surface 512. The object-side surface 511 and the image-side surface 512 of the first lens element 510 are aspheric.

The second lens element 520 is made of plastic material (ex. PC—Polycarbonate material). The second lens element 520 with positive refractive power has a concave object-side surface 521 and a convex image-side surface 522. The object-side surface 521 and the image-side surface 522 of the second lens element 520 are aspheric.

The third lens element 530 is made of plastic material (ex. OKP4HT—polyester material). The third lens element 530 with positive refractive power has a concave object-side surface 531 and a convex image-side surface 532. The object-side surface 531 and the image-side surface 532 of the third lens element 530 are aspheric. Furthermore, the third lens element 530 has inflection points formed on the object-side surface 531 and the image-side surface 532 thereof.

The equation of the aspheric surface profiles of the aforementioned lens elements of the fifth embodiment is the same as that of the first embodiment, and will not be stated herein again.

In the image capturing optical system according to the fifth embodiment, the focal length and the refractive index are calculated based on a wavelength of 587.6 nm.

In the image capturing optical system according to the fifth embodiment, the definitions of f, Fno, HFOV, f1, f2, f3, R3, R4, R5, CT1, T12, T23, SL, TTL and ImgH are the same as those stated in the first embodiment with corresponding values for the fifth embodiment, and they satisfy the following relationships:

| f(mm) | 2.25 | R5/f | −0.19 |
|---|---|---|---|
| Fno | 4.01 | (R3 + R4)/(R3 − R4) | 1.44 |
| HFOV(degrees) | 50.5 | CT1/T12 | 0.71 |
| f/f2 | 1.79 | T12/T23 | 0.80 |
| f/f3 | 0.14 | SL/TTL | 0.85 |
| f2/f1 | 0.27 | TTL/ImgH | 1.74 |

The detailed optical data of the fifth embodiment is shown in Table 9, and the aspheric surface data is shown in Table 10 as follows.

TABLE 9

(Embodiment 5)
f = 2.25 mm, Fno = 4.01, HFOV = 50.5 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | 3.157708 (ASP) | 0.313 | Plastic | OKP4HT | 1.633 | 4.71 |
| 2 | | −50.937245 (ASP) | 0.193 | | | | |
| 3 | Ape. Stop | Plano | 0.251 | | | | |
| 4 | Lens 2 | −3.599991 (ASP) | 0.599 | Plastic | PC | 1.583 | 1.26 |
| 5 | | −0.647040 (ASP) | 0.558 | | | | |
| 6 | Lens 3 | −0.430808 (ASP) | 0.998 | Plastic | OKP4HT | 1.633 | 16.49 |
| 7 | | −0.785034 (ASP) | 0.400 | | | | |
| 8 | | Plano | 0.083 | | | | |
| 9 | Image | Plano | — | | | | |

The focal length and the refractive index are calculated based on a wavelength of 587.6 nm.

TABLE 10

Aspheric Coefficients

| | Surface # | | |
|---|---|---|---|
| | 1 | 2 | 4 |
| k = | −1.65619E+01 | 2.00000E+03 | −1.33118E+02 |
| A4 = | −2.04924E−01 | −1.27474E−01 | −6.96355E−01 |
| A6 = | 7.10912E−01 | 1.24642E+00 | 1.42681E+00 |
| A8 = | −1.44710E+00 | −5.68268E+00 | 6.37012E−01 |
| A10 = | 1.16174E+00 | 8.97182E+00 | −1.43053E+01 |
| A12 = | — | — | 8.80394E−04 |

| | Surface # | | |
|---|---|---|---|
| | 5 | 6 | 7 |
| k = | −3.27056E+00 | −1.00000E+00 | −7.63195E−01 |
| A4 = | −1.03678E+00 | 3.42104E−01 | 1.49957E−01 |
| A6 = | 1.88836E+00 | 4.77638E−01 | −3.56749E−02 |
| A8 = | −4.01556E+00 | −1.71349E−01 | 8.65424E−02 |
| A10 = | 1.01009E+01 | −2.17996E−01 | −5.82187E−02 |
| A12 = | −9.35854E+00 | 1.10589E−01 | 1.39686E−02 |

Figure 11:
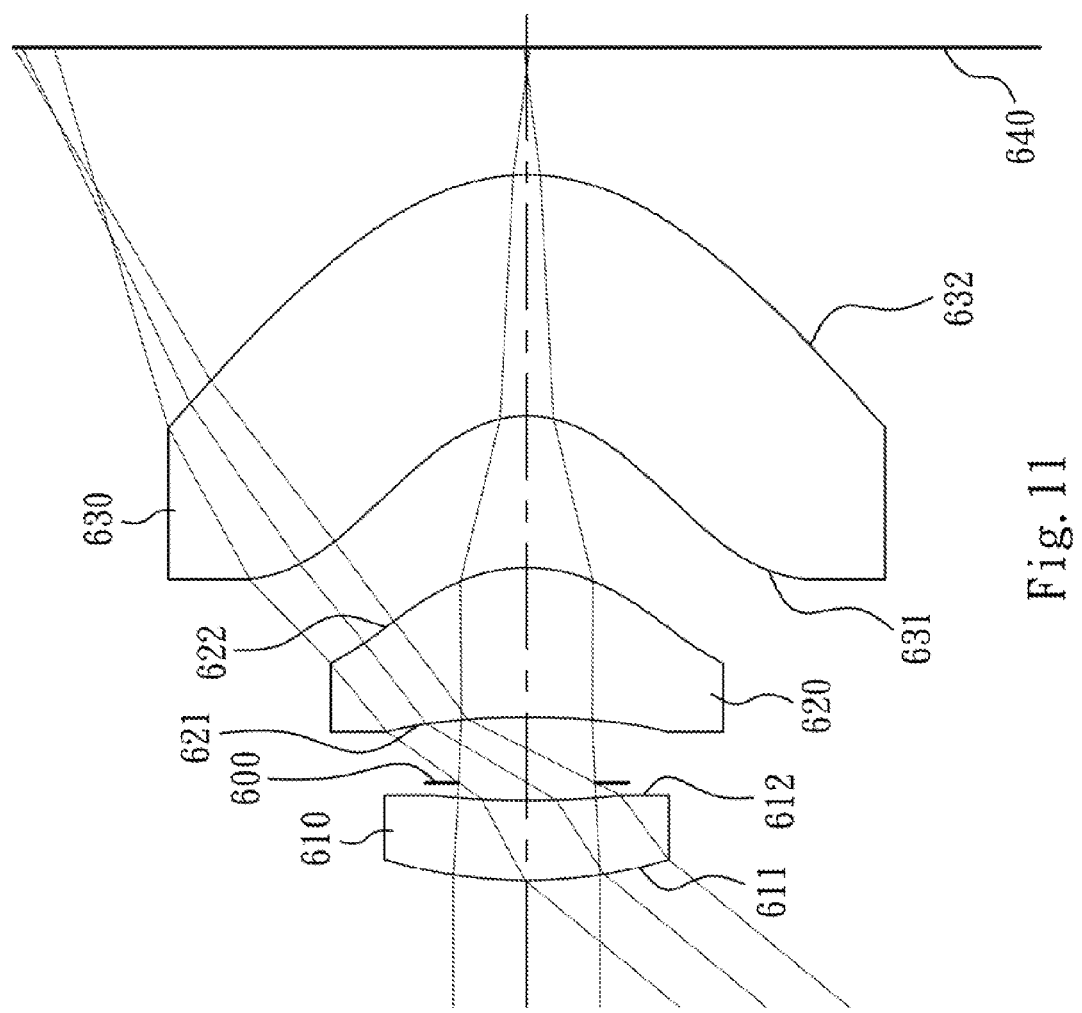
FIG. 11 is a schematic view of an image capturing optical system according to the sixth embodiment.
Figure 12:
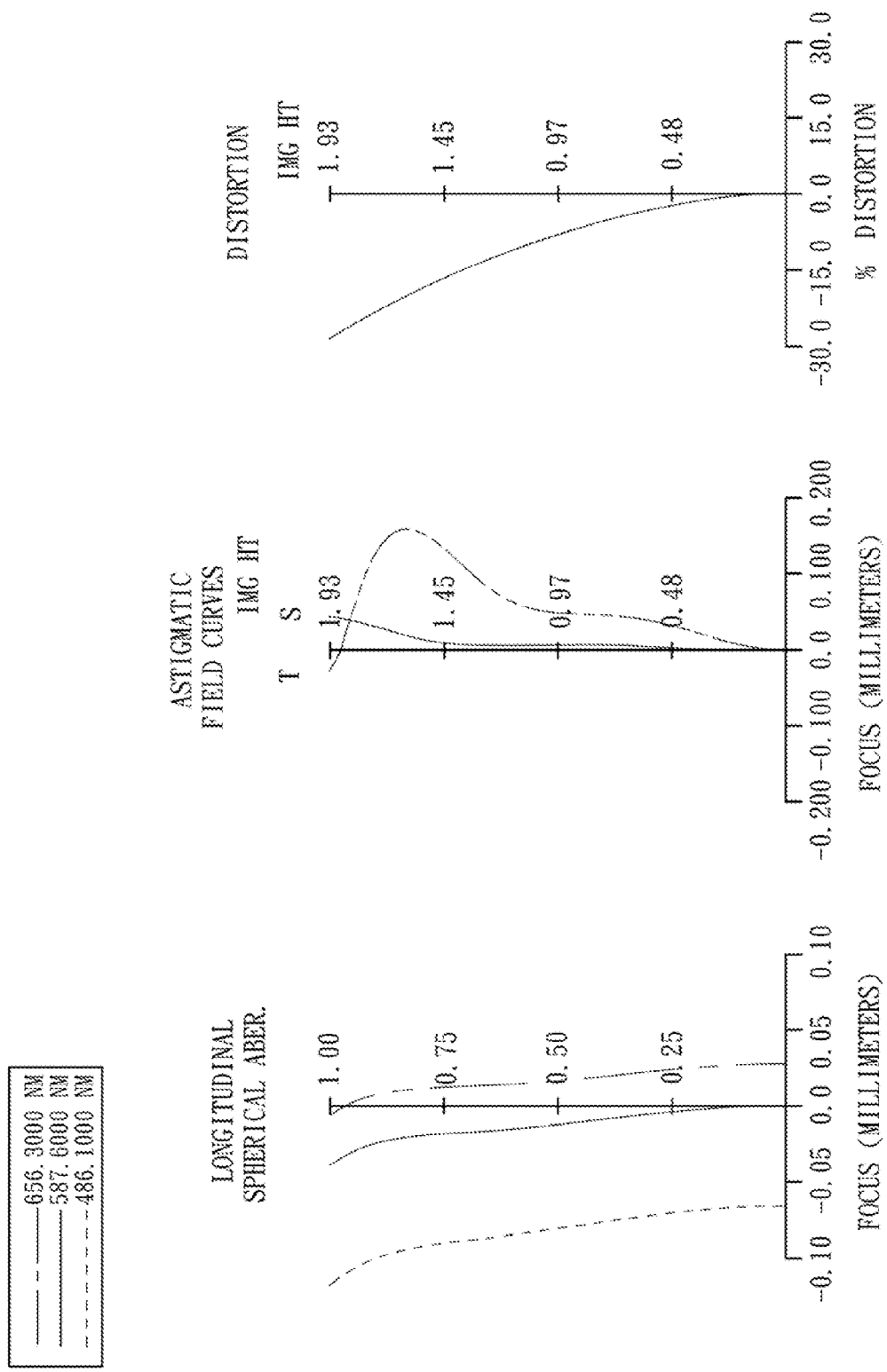
FIG. 12 shows spherical aberration curves, astigmatic field curves and distortion curve of the image capturing optical system according to the sixth embodiment.

FIG. 11 is a schematic view of an image capturing optical system according to the sixth embodiment. FIG. 12 shows spherical aberration curves, astigmatic field curves and distortion curve of the image capturing optical system according to the sixth embodiment. In FIG. 11, the image capturing optical system includes, in order from an object side to an image side: the first lens element 610, an aperture stop 600, the second lens element 620, the third lens element 630 and an image plane 640. The image capturing optical system further includes an image sensor that is located on the image plane 640.

The first lens element 610 is made of plastic material (ex. OKP4HT—polyester material). The first lens element 610 with positive refractive power has a convex object-side surface 611 and a concave image-side surface 612. The object-side surface 611 and the image-side surface 612 of the first lens element 610 are aspheric.

The second lens element 620 is made of plastic material (ex. PC—Polycarbonate material). The second lens element 620 with positive refractive power has a concave object-side surface 621 and a convex image-side surface 622. The object-side surface 621 and the image-side surface 622 of the second lens element 620 are aspheric.

The third lens element 630 is made of plastic material (ex. OKP4—polyester material). The third lens element 630 with positive refractive power has a concave object-side surface 631 and a convex image-side surface 632. The object-side surface 631 and the image-side surface 632 of the third lens element 630 are aspheric. Furthermore, the third lens element 630 has inflection points formed on the object-side surface 631 and the image-side surface 632 thereof.

The equation of the aspheric surface profiles of the aforementioned lens elements of the sixth embodiment is the same as that of the first embodiment, and will not be stated herein again.

In the image capturing optical system according to the sixth embodiment, the focal length and the refractive index are calculated based on a wavelength of 587.6 nm.

In the image capturing optical system according to the sixth embodiment, the definitions of f, Fno, HFOV, f1, f2, f3, R3, R4, R5, CT1, T12, T23, SL, TTL and ImgH are the same as those stated in the first embodiment with corresponding values for the sixth embodiment, and they satisfy the following relationships:

| | | | |
|---|---|---|---|
| f(mm) | 2.25 | R5/f | −0.20 |
| Fno | 3.90 | (R3 + R4)/(R3 − R4) | 1.44 |
| HFOV(degrees) | 50.6 | CT1/T12 | 0.95 |
| f/f2 | 1.75 | T12/T23 | 0.55 |
| f/f3 | 0.05 | SL/TTL | 0.88 |
| f2/f1 | 0.24 | TTL/ImgH | 1.65 |

The detailed optical data of the sixth embodiment is shown in Table 11, and the aspheric surface data is shown in Table 12 as follows.

TABLE 11

(Embodiment 6)
f = 2.25 mm, Fno = 3.90, HFOV = 50.6 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | 1.793743 (ASP) | 0.314 | Plastic | OKP4HT | 1.633 | 5.33 |
| 2 | | 3.571429 (ASP) | 0.070 | | | | |
| 3 | Ape. Stop | Plano | 0.259 | | | | |
| 4 | Lens 2 | −3.690359 (ASP) | 0.587 | Plastic | PC | 1.583 | 1.29 |
| 5 | | −0.659982 (ASP) | 0.598 | | | | |
| 6 | Lens 3 | −0.440775 (ASP) | 0.951 | Plastic | OKP4 | 1.607 | 48.66 |
| 7 | | −0.788486 (ASP) | 0.400 | | | | |
| 8 | | Plano | 0.027 | | | | |
| 9 | Image | Plano | — | | | | |

The focal length and the refractive index are calculated based on a wavelength of 587.6 nm.

TABLE 12

| Aspheric Coefficients | | | |
|---|---|---|---|
| | Surface # | | |
| | 1 | 2 | 4 |
| k = | −3.85146E+00 | −1.27397E+02 | −1.08312E+02 |
| A4 = | −1.58360E−01 | 1.31046E−01 | −5.34094E−01 |
| A6 = | 8.46409E−01 | 1.53436E+00 | 1.07688E+00 |
| A8 = | −9.99617E−01 | 7.03553E+00 | 1.93823E+00 |
| A10 = | 2.98448E−01 | −7.89630E+01 | −9.97253E+00 |
| A12 = | — | — | −5.59440E−06 |
| | Surface # | | |
| | 5 | 6 | 7 |
| k = | −3.14806E+00 | −1.00000E+00 | −7.82943E−01 |
| A4 = | −9.59645E−01 | 2.53189E−01 | 1.46613E−01 |
| A6 = | 1.64165E+00 | 5.18458E−01 | −4.44487E−02 |
| A8 = | −3.45357E+00 | −1.42191E−01 | 8.74830E−02 |

TABLE 12-continued

| Aspheric Coefficients | | | |
|---|---|---|---|
| A10 = | 1.02912E+01 | −2.21747E−01 | −5.82369E−02 |
| A12 = | −9.35999E+00 | 1.02358E−01 | 1.35536E−02 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing optical system comprising, in order from an object side to an image side:
   a first lens element with positive refractive power having a convex object-side surface;
   a second lens element with positive refractive power having a concave object-side surface and a convex image-side surface; and
   a third lens element with positive refractive power having a concave object-side surface and a convex image-side surface, wherein the object-side surface and the image-side surface of the third lens element are aspheric, and the third lens element is made of plastic material;
   wherein the image capturing optical system has a total of three lens elements with refractive power, a focal length of the image capturing optical system is f, a focal length of the second lens element is f2, and they satisfy the following relationship:

$$1.2 < f/f2 < 2.4.$$

2. The image capturing optical system of claim 1, wherein the second lens element is made of plastic material, the object-side surface and the image-side surface of the second lens element are aspheric, and the third lens element has at least one inflection point armed on at least one of the object-side surface and the image-side surface thereof.

3. The image capturing optical system of claim 2, further comprising:
   a stop, wherein an axial distance between the stop and an image plane is SL, an axial distance between the object-side surface of the first lens element and the image plane is TTL, and they satisfy the following relationship:

$$0.68 < SL/TTL < 0.93.$$

4. The image capturing optical system of claim 3, wherein a curvature radius of the object-side surface of the second lens element is R3, a curvature radius of the image-side surface of the second lens element is R4, and they satisfy the following relationship:

$1<(R3+R4)/(R3-R4)<5.$

5. The image capturing optical system of claim 4, wherein an axial distance between the first lens element and the second lens element is T12, an axial distance between the second lens element and the third lens element is T23, and they satisfy the following relationship:

$0.1 \leq T12/T23 \leq 1.0.$

6. The image capturing optical system of claim 4, wherein a focal length of the first lens element is f1, the focal length of the second lens element is f2, and they satisfy the following relationship:

$0.1<f2/f1<0.6.$

7. The image capturing optical system of claim 6, wherein a curvature radius of the object-side surface of the third lens element is R5, the focal length of the image capturing optical system is f, and they satisfy the following relationship:

$-0.4<R5/f<-0.1.$

8. The image capturing optical system of claim 6, wherein the first lens element has a concave image-side surface.

9. The image capturing optical system of claim 4, wherein a focal length of the first lens element is f1, the focal length of the second lens element is f2, and they satisfy the following relationship:

$0.2<f2/f1<0.4.$

10. The image capturing optical system of claim 4, wherein a central thickness of the first lees element is CT1, the axial distance between the first lens element and the second lens element is T12, and they satisfy the following relationship:

$0.4<CT1/T12<1.3.$

11. The image capturing optical system of claim 2, wherein the focal length of the image capturing optical system is f, a focal length of the third lens element is f3, and they satisfy the following relationship:

$0.0<f/f3<0.3.$

12. The image capturing optical system of claim 11, wherein the curvature radius of the object-side surface of the second lens element is R3, the curvature radius of the image-side surface of the second lens element is R4, and they satisfy the following relationship:

$1.0<(R3+R4)/(R3-R4)<2.5.$

13. The image capturing optical system of claim 2, further comprising:
an image sensor located on an image plane, wherein a half of a diagonal length of an effective photosensitive area of the image sensor is ImgH, the axial distance between the object-side surface of the first lens element and the image plane is TTL, and they satisfy the following relationship:

$TTL/ImgH<1.8.$

14. The image capturing optical system of claim 1, wherein the image capturing optical system is applied to the wavelength between 750 nm and 1200nm.

15. An image capturing optical system comprising, in order from an object side to an image side:
a first lens element with positive refractive power having a convex object-side surface;
a second lens element with positive refractive power having a concave object-side surface and a convex image-side surface; and
a third lens element with positive refractive power having a concave object-side surface and a convex image-side surface, wherein the object-side surface and the image-side surface of the third lens element are aspheric, and the third lens element is made of plastic material;
wherein the image capturing optical system has a total of three lens elements with refractive power, a focal length of the image capturing optical system is f, a focal length of the third lens element is f3, and they satisfy the following relationship:

$0.0<f/f3<0.3.$

16. The image capturing optical system of claim 15, wherein the second lens element is made of plastic material, the object-side surface and the image-side surface of the second lens element are aspheric, and the third lens element has at least one inflection point formed on at least one of the object-side surface and the image-side surface thereof.

17. The image capturing optical system of claim 16, wherein a curvature radius of the object-side surface of the second lens element is R3, a curvature radius of the image-side surface of the second lens element is R4, and they satisfy the following relationship:

$1.0<(R3+R4)/(R3-R4)<2.5.$

18. The image capturing optical system of claim 16, further comprising:
an image sensor located on an image plane, wherein a half of a diagonal length of an effective photosensitive area of the image sensor is ImgH, an axial distance between the object-side surface of the first lens element and the image plane is TTL, and they satisfy the following relationship:

$TTL/ImgH<1.8.$

19. The image capturing optical system of claim 15, wherein the image capturing optical system is applied to the wavelength between 750 nm and 1200 nm.

* * * * *